United States Patent [19]

Tagawa

[11] Patent Number: 4,995,280

[45] Date of Patent: Feb. 26, 1991

[54] BICYCLE SPEED CHANGE LEVER ASSEMBLY

[75] Inventor: Koichi Tagawa, Kawachinagano, Japan

[73] Assignee: Maeda Industries, Ltd., Osaka, Japan

[21] Appl. No.: 514,279

[22] Filed: Apr. 25, 1990

[30] Foreign Application Priority Data

Jun. 26, 1989 [JP] Japan .................................. 1-165005

[51] Int. Cl.⁵ ...................... B62M 25/04; G05G 11/00
[52] U.S. Cl. .................................. 74/480 R; 74/475; 74/502.2
[58] Field of Search .................... 74/480 R, 475, 502.2

[56] References Cited

U.S. PATENT DOCUMENTS 1,551,823  9/1925  Guy ..................................... 74/502.2
3,800,614  4/1974  Johnson ............................. 74/480 R

FOREIGN PATENT DOCUMENTS 55-20909   6/1980  Japan .
59/43191  12/1984  Japan .
60-149485 10/1985  Japan .
477960    1/1938  United Kingdom ............... 74/502.2

Primary Examiner—Allan D. Herrmann
Assistant Examiner—David W. Laub
Attorney, Agent, or Firm—William H. Eilberg

[57] ABSTRACT

A bicycle speed change lever assembly according to the present invention comprises a first lever, a second lever and a reversal connecting mechanism. The first lever is pivotally supported by a first pivot shaft and connected to one end of a control cable. The second lever is pivotally supported by a second pivot shaft which is displaced from the first pivot shaft but extends in parallel thereto. The reversal connecting mechanism connects the first lever to the second lever in such a way that when one of the levers is progressively pivoted in one direction, the other lever is progressivley pivoted in the opposite direction.

13 Claims, 3 Drawing Sheets

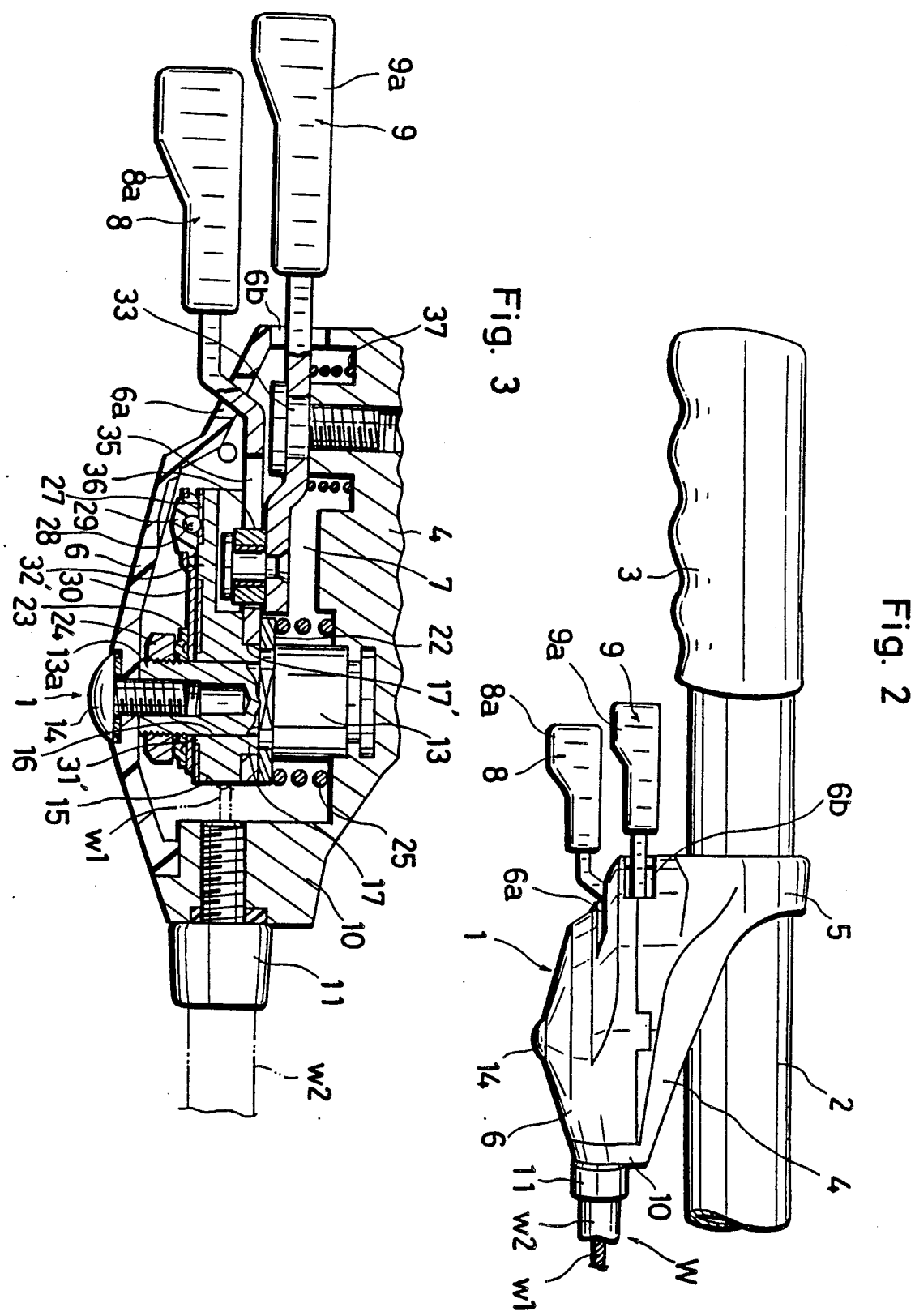

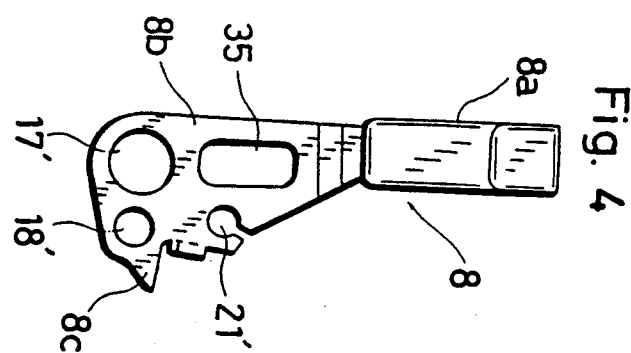
Fig. 4
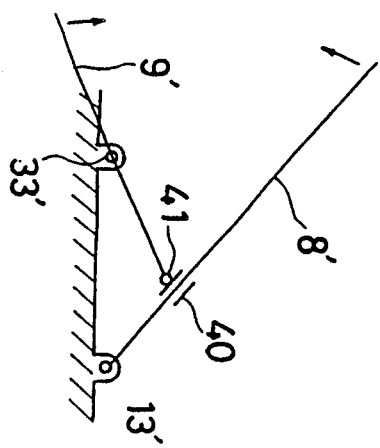
Fig. 8
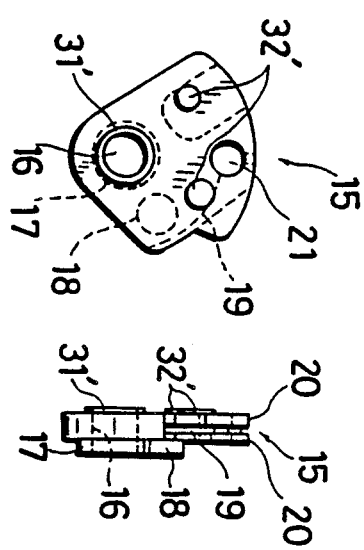
Fig. 5
Fig. 6
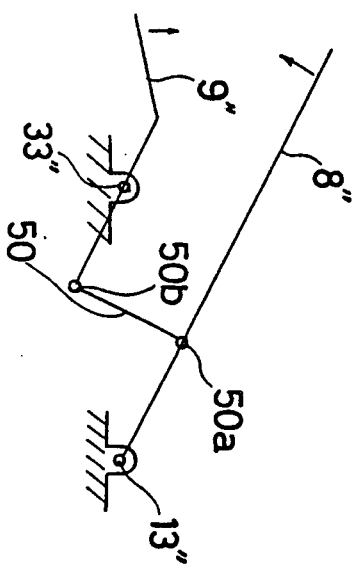
Fig. 9
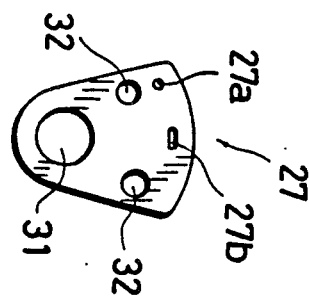
Fig. 7

BICYCLE SPEED CHANGE LEVER ASSEMBLY

BACKGROUND OF THE INVENTION

1. Field of the Invention

This invention relates generally to a speed change lever assembly which is used for displacing a front or rear deraileur relative to a multiple sprocket. More particularly, the present invention concerns a speed change lever assembly of the type wherein pressing of one lever causes the deraileur to move in one direction, whereas pressing of another lever causes the deraileur to move in the opposite direction.

2. Description of the Prior Art

As is well known, a bicycle speed change system comprises a deraileur mounted adjacent a front or rear gear (multiple sprocket) for movement axially of the gear, and a lever assembly mounted on a suitable portion of a bicycle frame or handlebar and connected to the deraileur by means of a control cable. The lever assembly is operated to displace the deraileur relative to the gear, thereby shifting the chain from one sprocket to another of the gear for speed change.

A typical speed change lever assembly includes a single lever pivotally supported at its boss portion on a fixed shaft. The boss portion of the lever works also as a cable winder connected to one end of a control cable whose other end is connected to a deraileur. When the lever is pivoted in one direction, the control cable is wound up on the lever boss portion against a tension applied to the cable by a return spring which is incorporated in the deraileur. When the lever is pivoted in the opposite direction, the cable is paid out from the lever boss portion under the tension of the return spring. Such cable movements are transmitted to the deraileur for movement thereof relative to a front or rear gear, thereby performing an intended chain shift.

With the lever assembly described above, the lever has to be pressed and pulled respectively for winding up and paying out the cable. Therefore, it is necessary for the cyclist to use two different kinds of finger movements for operating the lever in the two pivotal directions. Thus, the operability of the typical lever assembly is relatively poor. Such poor operability becomes particularly problematic when the lever provides a large pivotal angle.

In an attempt to solve the above problem, there has been proposed to use a double lever assembly, as disclosed for example in Japanese Patent Publication No. 55-20909 (Published: June 5, 1980; Applicant: Bridgestone Cycle Co., Ltd.; Inventor: Kunitoshi KOSAKAI) or Japanese Utility Model Publication No. 59-43191 (Published: Dec. 20, 1984; Applicant: Shimano Industrial Co., Ltd.; Inventor: Keizo SHIMANO). Specifically, the double lever assembly comprises a pair of levers pivotally supported on a common pivot shaft respectively on both sides of a fixed plate. The fixed plate has a retaining hole for holding a ball whose diameter is slightly larger than the wall thickness of the fixed plate, so that the ball is partially projectable from the retaining hole on either side of the plate. One of the levers is connected to a control cable under a tension, and formed with a positioning hole which disengages from the ball in a first pivotal limit position (cable pay-out position) of the one lever but engages with the ball in a second pivotal limit position (cable winding position) of the one lever. The other lever is also formed with a positioning hole which engages with the ball in a first pivotal limit position of the other lever but disengages from the ball in a second pivotal limit position of the other lever. Both levers are always urged toward their respective first pivotal limit positions by the tension of the control cable and/or a separate spring.

In operation, when the one lever assumes its first limit position with the positioning hole thereof disengaging from the ball, the other lever is held in its first position by the ball engaging with the positioning hole of the other lever. In this condition, the control cable is fully paid out from the one lever. When the one lever is pivoted to its second limit position to fully wind up the control cable, the ball comes into engagement with the positioning hole of the one lever but disengages from the positioning hole of the other lever, so that the other lever is pivoted by the urging force of the spring to its second limit position which substantially corresponds to the first limit position of the one lever. On the other hand, when the other lever is pressed to its first limit position, the ball comes into engagement with the positioning hole of the other lever lever but disengages from the positioning hole of the one lever, so that the one lever is pivoted to its first limit position by the tension of the control cable (additionally by the urging force of the spring).

In this way, the double lever assembly is capable of shifting up and down only by pressing either one of the two levers. However, such a lever assembly is disadvantageous in the following respects.

First, each of the levers can take only two limit positions, so that the prior art double lever assembly is not capable of selecting three or more speeds. Second, the pivotal movement (returning movement) of the one lever from its second position to its first position is initiated only after the other lever has been completely pivoted to its first position. Thus, the pivotal pressing operation of the other lever does not cause the control cable to be immediately paid out from the one lever. In other words, the prior art double lever assembly fails to provide a quick operating response at least with respect to the cable pay-out operation.

SUMMARY OF THE INVENTION

It is, therefore, an object of the present invention to provide a bicycle speed change lever assembly which enables shift-up and shift-down only by a lever pressing operation while providing the capability of selecting three or more speeds with operational reliability.

Another object of the present invention is to provide a speed change lever assembly wherein a lever pivoting operation is facilitated.

A further object of the present invention is to provide a speed change lever assembly which is capable of operating a deraileur with a quick response both in the shift-up and shift-down directions.

Still another object of the present invention is to provide a speed change lever assembly which incorporates a click mechanism to enable an accurate lever positioning.

According to the present invention, there is provided a bicycle speed change lever assembly comprising: a first lever pivotally supported by a first pivot shaft, the first lever being connected to one end of a control cable; a second lever pivotally supported by a second pivot shaft which is displaced from the first pivot shaft but extends in parallel thereto; and a reversal connecting mechanism for connecting the first lever to the second lever in such a way that when one of the levers is progressively pivoted in one direction, the other lever is progressively pivoted in the opposite direction.

Preferably, the first lever has a presser portion at one end and is pivotally supported by the first pivot shaft at the other end, whereas the second lever also has a presser portion at one end but is pivotally supported at an intermediate portion. The reversal connecting mechanism connects the other end of the second lever to an intermediate portion of the first lever.

Advantageously, the distance between the presser portion of the second lever and the second pivot shaft is set smaller than that between the presser portion of the first lever and the first pivot shaft, whereby the presser portions of the respective levers move along two mutually close pivotal paths. According to this arrangement, the presser portions of the first and second levers assume respective first limit positions which are away from each other, but when the presser portion of the first lever is pivoted to a second limit position, the presser portion of the second lever assumes a second limit position which substantially corresponds to the first limit position of the first lever presser portion.

The first lever may be spring-biased in a direction for counteracting a tension applied to the control cable. In this case, pivoting of the first lever in the cable winding direction is greatly facilitated.

Further, the first lever may be provided with a click mechanism which produces a clicking feel at each of predetermined pivotal positions of the first lever. Such an arrangement makes it easier to precisely position the first lever for operating the deraileur as intended.

BRIEF DESCRIPTION OF THE DRAWINGS

In the accompanying drawing:

FIG. 2 is a view, in a reduced scale, of the same lever assembly as seen in the direction of an arrow II in FIG. 1;

FIG. 3 is a sectional view of the same lever assembly as shown in FIG. 2;

FIG. 4 is a front view showing a first lever incorporated into the lever assembly;

FIG. 5 is a front view showing a winding member incorporated into the lever assembly;

FIG. 6 is a side view showing the same winding member;

FIG. 7 is a front view showing a click plate incorporated into the lever assembly;

FIG. 8 is a schematic view showing a slightly modified speed change lever assembly according to the invention; and FIG. 9 is a schematic view showing another modified speed change lever assembly according to the present invention.

DETAILED DESCRIPTION

Figure 1:
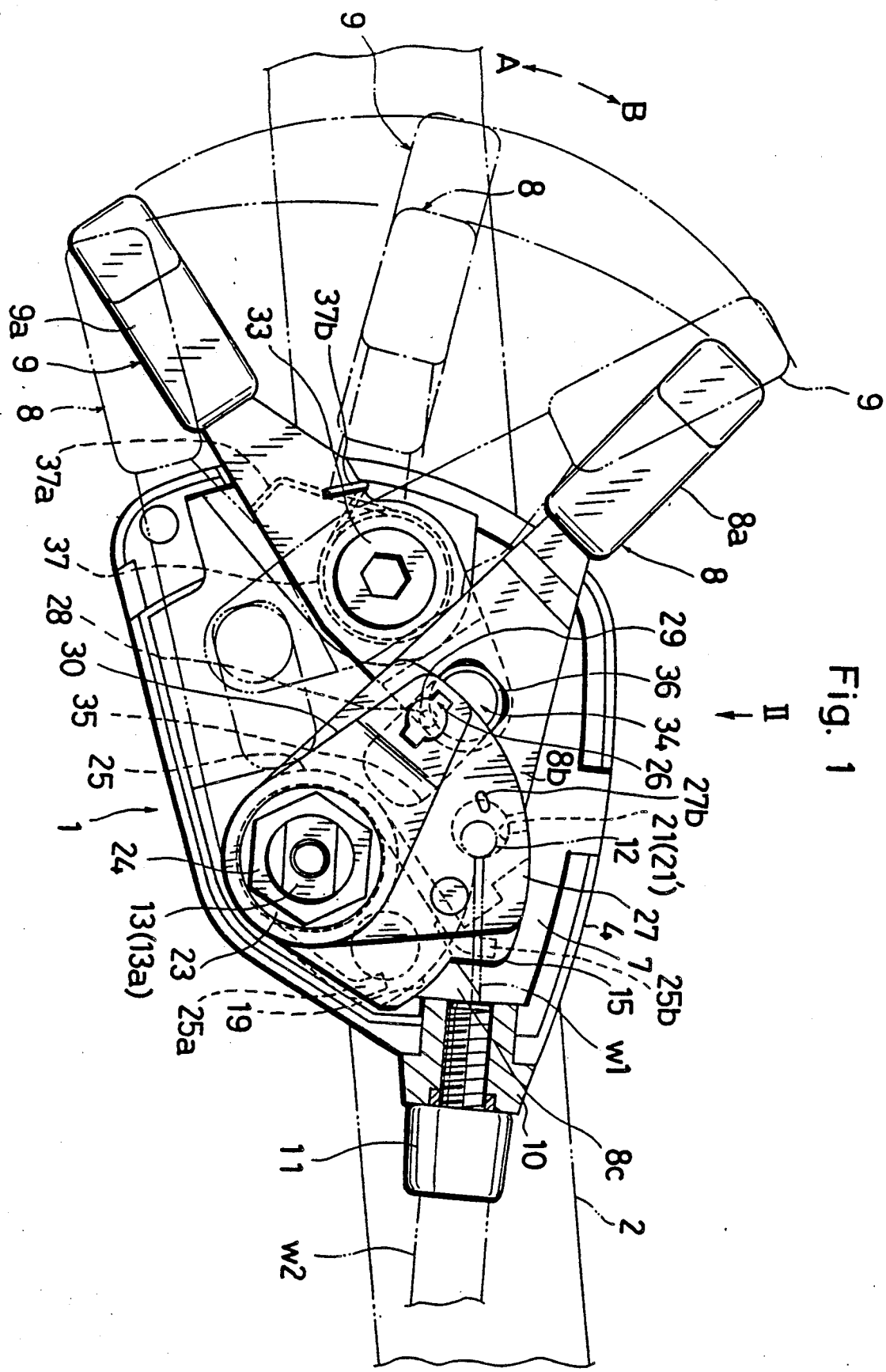
FIG. 1 is a view showing a speed change lever assembly according to an embodiment of the present invention as mounted to a bicycle handlebar, wherein a cover member of the lever assembly is removed to show the interior structure thereof.

Referring now to FIGS. 1 to 3 of the accompanying drawings, there is shown a speed change lever assembly 1 as mounted to a bicycle handlebar 2 adjacent to its left hand grip portion 3 (FIG. 2). The lever assembly is connected to a remote front or rear deraileur (not shown) by means of a double control cable W which includes an inner wire w1 and an outer sheath w2 enclosing the inner wire.

The lever assembly 1 comprises a base member 4. According to the illustrated embodiment, the base member is integrally formed with a clamp band 5 (FIG. 2) which is used for mounting the lever assembly to the handlebar 2. A cover member 6 is fixed to the base member to define a mounting space 7 (see FIGS. 1 and 3) between these two parts.

The lever assembly 1 further comprises a first lever 8 and a second lever 9. These two levers are partially located within the mounting space 7, but project outward through respective slits 6a, 6b of the cover member 6 (see particularly FIG. 3) to provide respective presser portions 8a, 9a. The respective slits are so sized as to allow intended pivotal movement of the corresponding levers.

Preferably, the lever assembly 1 is mounted in such a way that the presser portions 8a, 9a of the respective levers 8, 9 are located below the handlebar 2 adjacent the grip portion 3. Such mounting is advantageous because the rider can bring his or her thumb to the respective lever presser portions 8a, 9a for operation thereof without substantially changing the gripping condition.

The base member 4 has a cable introducing portion 10 on the side away from the lever presser portions 8a, 9a. One end of the outer sheath w2 is received by a cable stopper 11 which is screwed in the cable introducing portion. On the other hand, one end of the inner wire w1 extends through the cable stopper 11 into the mounting space 7 of the lever assembly, and is provided with an anchoring nipple 12 (FIG. 1).

The first lever 8 has an enlarged base plate portion 8b which is pivotally supported by a first pivot shaft 13 within 10 the mounting space 7 of the lever assembly. Preferably, the first pivot shaft is incorporated as an insert into the base member 4 when molding the latter. Indicated at 14 is a set screw engaging into the first pivot shaft for fixing the cover member 6 to the base member.

Also pivotally supported on the first pivot shaft 13 is a winding member 15 which is generally sector-shaped according to the illustrated embodiment, as shown in FIG. 5. For this purpose, the winding member has a pivot bore 16 for fitting on the first pivot shaft.

The winding member 15 is overlapped on the base plate portion 8b of the first lever 8 in a manner such that the winding member is co-pivotable with the first lever. For this purpose, as shown in FIGS. 4 to 6, the winding member 15 is formed with an annular projection 17 at the position of the pivot bore 16 as well as with an engaging pin 18, whereas the lever base plate portion 8b is provided with corresponding holes 17', 18' for respectively receiving the annular projection 17 and the engaging pin 18.

The winding member 15 also has an arcuate winding groove 19 defined between a pair of peripheral flanges 20, as shown in FIGS. 5 and 6. The winding groove is used for guiding the inner wire w1 of the control cable W, as shown in FIG. 1. For engaging the end anchoring nipple 12 of the inner wire, the winding member 15 is further formed with an anchoring bore 21 which receives the anchoring nipple. To facilitate introduction of the anchoring nipple into the anchoring bore, the base plate portion 8b of the first lever 8 is formed with a nipple introduction bore 21' in alignment with the anchoring bore 21 (see FIGS. 1 and 4). The nipple is inserted laterally into the anchoring bore 21 from the side of the introduction bore 21'.

As already described, the winding member 15 is pivotable with the first lever 8. Thus, when the first lever is pivoted, the inner wire w1 of the control cable 5 is wound up onto or paid out from the winding groove 19 of the winding member 15. It should be appreciated that the inner wire is always kept under tension applied by a return spring (not shown) which is incorporated into the front or rear derailleur (also not shown).

The base plate portion 8b of the first lever 8 and the winding member 15 are interposed between a friction washer 22 and a spring washer 23, as shown in FIG. 3. Both washers are non-rotatably mounted on the first pivot shaft 13. A nut 24 is screwed on a threaded front portion 13a of the pivot shaft. Thus, when the nut 24 is tightened up, the spring washer 23 applies an axial presser to the winding member 15 to generate a frictional resistance, so that the first lever 8 can be frictionally held at any pivotal position even if the inner wire w1 is kept under tension.

As shown in FIGS. 1 and 3, a first coil spring 25 is arranged on the first pivot shaft 13 between the friction washer 22 and the base member 4. The coil spring has one end 25a engaging with the base member (see FIG. 1), whereas the other end 25b of the coil spring engages with the first lever 8. Thus, the coil spring tends to pivot the first lever in the direction of an arrow A to counteract the tension applied to the inner wire w1 of the control cable W. Of course, the urging force of the coil spring is smaller than the tension of the inner wire. In this way, the pivotal movement of the first lever in the cable winding direction A can be greatly facilitated.

According to the illustrated embodiment, the first lever 8 is rendered clickingly or indexingly pivotable by means of a click mechanism 26 (see FIG. 1). The illustrated click mechanism comprises a click plate 27 and a ball 28 retained by a holder 29 which in turn is supported by a spring plate 30.

The click plate 27 is overlapped on the winding member 15 on the side thereof opposite the base plate portion 8b of the first lever 8. As shown in FIG. 7, the click plate is generally sector-shaped, and has a base bore 31 and a pair of engaging bores 32. On the other hand, the winding member 15 has a second annular projection 31' at the position of the pivot bore 16 for fitting in the base bore 31 of the click plate, as shown in FIGS. 3, 5 and 6. The winding member further has a pair of engaging projections 32' for fitting in the respective engaging bores 32 of the click plate. Thus, the click member is rendered pivotable with the first lever 8.

The click plate 27 is further formed with clicking holes 27a, 27b (first and second clicking holes) with which the ball 28 selectively engages as the first lever 8 is pivoted (see FIGS. 1 and 7). The spring plate 30 supporting the ball holder 29 is non-rotatably mounted on the first pivot shaft 13 to hold the ball at a fixed position, and elastically presses the ball against the click plate. Thus, the ball produces a 10 clicking feel every time it engages with a selected one of the clicking holes 27a, 27b.

According to the illustrated embodiment, the number of the clicking holes 27a, 27b is two. The ball 28 engages with the first clicking hole 27a when the first lever 8 is fully pivoted in the direction (cable pay-out direction) of an arrow B to assume a first position indicated by solid lines in FIG. 1. On the other hand, when the first lever is pivoted in the cable winding direction to assume an intermediate pivotal position (second position) indicated by one-dot chain lines in FIG. 1, the ball engages with the second clicking hole 27b which is slightly elongated to allow for variations in sprocket position for example. Therefore, two sprocket positions are distinctly recognizable by the clicking engagement.

The first lever 8 may be further pivoted in the cable winding direction A to assume a third position indicated by two-dot chain line in FIG. 1. In this position, however, no clicking hole is provided which engages with the ball 28 because pivotal movement of the first lever in the cable winding direction A is limited by a stopper (not shown) associated with the unillustrated derailleur, thereby making the third position clearly recognizable. It is of course possible to provide an additional clicking hole corresponding to the third pivotal position of the first lever.

As understood from FIGS. 1 and 4, the base plate portion 8b of the first lever 8 has an engaging ear 8c which comes into abutment with the cable introducing portion 10 of the base member 4 when the first lever assumes the first position (solid line position). Thus, pivotal movement of the first lever in the cable pay-out direction B is also limited, thereby making it possible to clearly recognize the first position without the provision of a corresponding clicking hole. According to the illustrated embodiment, however, the first clicking hole 27a corresponding to the first pivotal position is provided for the following purpose.

As already described, the end nipple 12 of the inner wire w1 is connected to the winding member 15 (the first lever 8), whereas the other end (not shown) of the inner wire is connected to the unillustrated derailleur. Just before connecting the inner wire to the derailleur, the first lever should be pivoted fully in the cable pay-out direction B to enable or facilitate subsequent proper connection of the inner wire to the derailleur. However, the first lever is always urged in the cable winding direction A by the coil spring 25, whereas the inner wire is not tensioned prior to its connection to the derailleur. Therefore, if no means is provided for retaining the first lever in the first pivotal position, it is unintentionally pivoted in the cable winding direction A by the coil spring, consequently hindering proper connection of the inner wire to the derailleur.

The engagement between the first clicking hole 27a and the ball 28 is sufficient to overcome the pivotal urging force imparted by the coil spring 25. Thus, it is possible to reliably hold the first lever 8 in the first position when connecting the inner wire w1 to the derailleur. After completion of such a wire connecting operation, the urging force of the coil spring 25 is positively utilized for counteracting a relatively large tension applied to the inner wire to thereby facilitate pivotal movement of the first lever in the cable winding direction A.

The second lever 9 is pivotally supported at an intermediate portion thereof by a second pivot shaft 33 removably screwed into the base member 4. The second pivot shaft is parallel to the first pivot shaft 13 and located farther from the cable introducing portion 10 of the base member than the first pivot shaft.

According to the illustrated embodiment, the distance between the second pivot shaft 33 and the presser portion 9a of the second lever is set smaller than that between the first pivot shaft 13 and the presser portion 8a of the first lever 8. Thus, in spite of the difference in position between the first and second pivot shafts 13, 33, the presser portions 8a, 9a of the respective levers 8, 9 move along two close pivotal paths, as shown in FIG. 1.

According to the present invention, the first lever 8 and the second lever 9 are connected to each other by means of a reversal connecting mechanism 34 (see FIG. 1). This reversal connecting means functions in such a way that when one of the levers is progressively pivoted in one direction, the other lever is caused to progressively pivot in the opposite direction.

In the illustrated embodiment, the reversal connecting mechanism 34 comprises an elongated guide opening 35 formed in the base plate portion 8b of the first lever 8, and a roller 36 movably received in the guide opening. The roller 36 is rotatably pinned to an end of the second lever 9 opposite its presser portion 9a. Thus, when the first lever 8 is pivoted in the cable winding direction A, the roller 36 is pressed by the guide opening 35, thereby causing the second lever 9 to pivot in the arrow B direction. On the other hand, when the second lever having been thus pivoted is pivoted in the arrow A direction, the roller 36 presses the guiding opening, consequently causing the first lever to pivot in the cable pay-out direction B.

As shown in FIGS. 1 and 3, the second lever 9 is always urged in the arrow A direction by means of a second coil spring 37. This spring has one end 37a engaging with the base member 4, whereas the other end 37b of the spring engages with the second lever. As a result, the roller 36 is held in pressing contact with the guide opening 35. The reason for providing such a coil spring is as follows.

In order for the reversal connecting mechanism 34 to work smoothly, it is necessary to provide a slight play between the guide opening 35 and the roller 36. However, such a play results in that movement transmission between the two levers 8, 9 occurs with a slight delay. The second coil spring 37 cancels this unexpected delay by holding the two levers in quickly responsive connection.

The operation of the speed change lever assembly 1 having the above structure is now described in detail.

It is now supposed that the first lever 8 takes the first pivotal position (solid line position) shown in FIG. 1. In this position, the inner wire w1 of the double control cable W is maximally paid out, and the second lever 9 also takes its first position (solid line position) wherein it is maximally away from the first lever. Further, the ball 28 of the click mechanism 26 engages with the first clicking hole 27a of the click plate 27.

When the first lever 8 is pivoted in the cable winding direction A to the intermediate or second position (indicated by the one-dot chain lines) to partially wind up the inner wire w1 against the tension applied thereto, the ball 28 engages with the second clicking hole 27b to notify that an intended chain shift has been performed. Pivotal movement of the first lever in the cable winding direction is facilitated by the urging force of the first coil spring 25, as described hereinbefore. On the other hand, the second lever 9 is pivoted in the arrow B direction to its intermediate or second position (indicated also by the one-dot chain lines) wherein it substantially overlaps with the first lever. The spring washer 23 produces a frictional force which is sufficient to overcome the tension applied to the inner wire, so that the respective levers 8, 9 can be held in their intermediate positions even if the first lever is liberated from a manual pivotal force.

When the first lever 8 is pivoted further in the cable winding direction A to the third position (indicated by the two-dot chain lines) to maximally wind up the inner wire w1, the second lever 9 is simultaneously pivoted further in the arrow B direction. As a result, a further intended chain shift is achieved, and the second lever is caused to assume its third position (indicated also by the two-dot chain lines) which generally corresponds to the first position of the first lever. The third position of the first lever is clearly recognizable to the rider because the cable winding pivotal unillustrated deraileur, as described before.

For pivotally returning the first lever 8, the second lever 9 instead of the first lever itself is manually pivoted in the arrow A direction. As a result, the first lever is pivoted in the cable pay-out direction B by means of the reversal connecting mechanism 34. It is of course possible to stop the first lever in its intermediate position by utilizing the clicking engagement between the ball 28 and the second clicking hole 27b. The complete return position (first position) of the first lever is clearly recognizable by the ball engaging with the first clicking hole 27a.

According to the present invention, the inner wire w1 of the double control cable W is pulled up and paid out by selectively pressing the first and second levers 8, 9 without any necessity of pulling these levers. Thus, the speed change easily than a typical speed change lever assembly including a single lever which must be pressed and pulled for speed change.

Further, pivotal movement of the first lever 8 in the cable pay-out direction B is performed by forcible pivotal movement of the second lever 9. Therefore, even if the frictional resistance between the inner wire w1 and the outer sheath w2 varies due to some cause, it is possible to reliably operate the lever assembly for winding up and paying out the inner wire w1.

With the prior art speed change lever assembly incorporating two levers, each of the respective levers is capable of assuming only two pivotal limit positions, and pivotal movement of one lever is initiated abruptly only when the other lever has been pivoted to one of its limit positions. Such functional limitations result in that the prior art lever assembly is usable only for selection of two speeds. According to the present invention, in contrast, when one lever is pivoted progressively in one direction, the other lever is also pivoted progressively but in the opposite direction, the pivotal movement of the other lever being initiated immediately upon starting pivotal movement of the one lever. Thus, it is possible to use the speed change lever assembly of the present invention for selecting three or more speeds in addition to selection of two speeds.

FIG. 8 schematically shows a slight modification wherein a sliding element 40 is slidably fitted on an intermediate portion of a first lever 8' which is pivotally supported by a first pivot shaft 13'. A second lever 9' is pivotally supported by a second pivot shaft 33', and has one end connected to the sliding element by means of a pivotal connecting element 41. Obviously, when one of the two levers 8, 9 is pivoted in one direction, the other lever is pivoted in the opposite direction.

FIG. 9 schematically illustrates another modification wherein a first lever 8" pivotally supported at one end by a first pivot shaft 13" is pivotally connected at an intermediate portion thereof to one end 50a of a link arm 50, whereas a second lever 9" pivotally supported at an intermediate portion thereof by a second pivot shaft 33" is pivotally connected at one end thereof to the other end 50b of the link arm. In this embodiment also, pivotal movement of one lever in one direction is accompanied by opposite pivotal movement of the other lever.

The present invention being thus described, it is obvious that the same may be varied in many other ways. For instance, the click member 27 together with its associated parts may be dispensed with, so that the first lever 8 is held in any pivotal position only by friction imparted by the spring washer 23. Alternatively, the spring washer 23 may be dispensed with, and the first lever may be held at a selected pivotal position only by the clicking engagement between the ball 28 and a selected one of the clicking holes 27a, 27b. Further, the first lever 8 may be formed integral with said winding member 15. Such variations are not to be regarded as a departure from the spirit and scope of the present invention, and all such modifications as would be obvious to those skilled in the art are intended to be included within the scope of the following claims.

I claim:

1. A bicycle speed change lever assembly comprising:
    a first lever pivotally supported by a first pivot shaft, said first lever being connected to one end of a control cable;
    a second lever pivotally supported by a second pivot shaft which is displaced from said first pivot shaft but extends in parallel thereto; and
    a reversal connecting mechanism for connecting said first lever to said second lever in such a way that when one of said levers is progressively pivoted in one direction, the other lever is progressively pivoted in the opposite direction.

2. The lever assembly as defined in claim 1, wherein each of said first and second levers has a presser portion at one end thereof, the other end of said first lever is pivotally supported by said first pivot shaft, said second lever being pivotally supported at an intermediate portion thereof by said second pivot shaft, said reversal connecting mechanism connecting the other end of said second lever to an intermediate portion of said first lever.

3. The lever assembly as defined in claim 2, wherein the distance between the presser portion of said second lever and said second pivot shaft is set smaller than that between the presser portion of said first lever and said first pivot shaft, whereby the presser portions of the respective levers move along two mutually close pivotal paths.

4. The lever assembly as defined in claim 2, wherein said reversal connecting mechanism comprises an elongated guide opening formed at said intermediate portion of said first lever, and a guided element provided at said other end of said second lever and movably received in said elongated guide opening.

5. The lever assembly as defined in claim 4, wherein said guided element is a roller rotatably carried at said other end of said second lever.

6. The lever assembly as defined in claim 5, wherein said second lever is urged in a returning pivotal direction by means of a spring.

7. The lever assembly as defined in claim 2, wherein said reversal connecting mechanism comprises a sliding element slidably fitting on said intermediate portion of said first lever, said sliding element being pivotally carried by said other end of said second lever.

8. The lever assembly as defined in claim 2, wherein said reversal connecting mechanism comprises a link arm pivotally connected at one end to said intermediate portion of said first lever, the other end of said link arm being pivotally connected to said other end of said second lever.

9. The lever assembly as defined in claim 2, wherein said first lever is urged by a spring in a pivotal direction to counteract a tension applied to said control cable.

10. The lever assembly as defined in claim 2, wherein said first lever is provided with a winding member which is co-pivotable with said first lever for winding up and paying out said control cable.

11. The lever assembly as defined in claim 2, wherein said first lever is interposed between a friction washer and a spring washer, whereby said first lever is imparted a frictional resistance which is sufficient to overcome a tension applied to said control cable.

12. The lever assembly as defined in claim 2, wherein said first lever is provided with a click mechanism which produces a clicking feel at each of predetermined pivotal positions of said first lever.

13. The lever assembly as defined in claim 12, wherein said click mechanism comprises a click plate rendered co-pivotable with said first lever and formed with at least one clicking hole, and a rolling element which is elastically supported at a fixed position for engagement with said clicking hole.

* * * * *